United States Patent
Monju

(10) Patent No.: US 7,781,524 B2
(45) Date of Patent: Aug. 24, 2010

(54) RELEASING COMPOSITION

(75) Inventor: Takuya Monju, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 641 days.

(21) Appl. No.: 11/743,445

(22) Filed: May 2, 2007

(65) Prior Publication Data

US 2007/0224372 A1  Sep. 27, 2007

Related U.S. Application Data

(62) Division of application No. 10/896,439, filed on Jul. 21, 2004, now Pat. No. 7,267,853.

(30) Foreign Application Priority Data

Jul. 30, 2003  (JP) .......................... 2003-203547

(51) Int. Cl.
*C08F 8/00*      (2006.01)
*C08L 83/00*    (2006.01)
*B41M 5/40*    (2006.01)

(52) U.S. Cl. ................ 525/101; 428/32.72; 428/32.81

(58) Field of Classification Search .............. 428/32.69, 428/32.72, 32.73, 32.81, 32.86, 212, 327, 428/402, 403, 407; 525/101, 106, 199
See application file for complete search history.

(56) References Cited

U.S. PATENT DOCUMENTS

| | | | | |
|---|---|---|---|---|
| 5,429,901 | A * | 7/1995 | Muto et al. | 430/108.11 |
| 6,103,441 | A * | 8/2000 | Tomita et al. | 430/110.4 |
| 6,337,131 | B1 * | 1/2002 | Rupaner et al. | 428/403 |

* cited by examiner

*Primary Examiner*—Mark Ruthkosky
*Assistant Examiner*—David J Joy
(74) *Attorney, Agent, or Firm*—K&L Gates LLP

(57) ABSTRACT

A releasing composition capable of improving abrasion resistance includes a releasing composition containing releasing particles in a film forming material, and the releasing particle has a first releasing resin as a core material and a second releasing resin as a coating material. The first releasing resin has a relatively higher releasing property than the second releasing resin. The first releasing resin can include a surface tension of from about 0.01 N/m to about 0.025 N/m, and the second releasing resin may have a surface tension of from about 0.026 N/m to about 0.05 N/m.

5 Claims, 4 Drawing Sheets

RELEASING COMPOSITION

CROSS REFERENCES TO RELATED APPLICATIONS

The present application is a divisional of U.S. application Ser. No. 10/896,439 filed on Jul. 21, 2004. This application claims priority to Japanese Patent Application No. P2003-203547 filed on Jul. 30, 2003. The disclosures of the above referenced applications are incorporated by reference herein.

BACKGROUND OF THE INVENTION

The present invention generally relates to a releasing composition. More specifically, the present invention relates to a releasing composition suitable for use in a thermal transfer recording medium, such as an ink ribbon.

In general, a thermal transfer recording medium often has such a structure that a releasing layer and an ink layer are formed consecutively on a polyester film, and with the thermal transfer recording medium, the releasing layer and the ink layer are transferred on a surface of a sheet by utilizing heat of a thermal head provided in a printer.

In a printed matter thus obtained through transfer, the ink layer is protected with the releasing layer formed on the ink layer.

In recent years, the thermal transfer recording medium of this kind is demanded to have high abrasion resistance after transfer.

In order to fulfill the demand, an acrylic resin having particles, for example, of polyethylene (PE), polytetrafluoroethylene (PTFE), wax or silicone, dispersed therein has been proposed as a material for the releasing layer.

However, sufficient abrasion resistance cannot be obtained by the conventional technique.

SUMMARY OF THE INVENTION

The present invention generally relates to a releasing composition. More specifically, the present invention relates to a releasing composition suitable for use in a thermal transfer recording medium, such as an ink ribbon. The present invention provides in an embodiment provides a releasing composition and a thermal transfer recording medium capable of improving the abrasion resistance.

To this end, the present invention pursuant to an embodiment provides a releasing composition. The releasing composition contains releasing particles in a prescribed film forming material, wherein the releasing particles contain a first releasing resin as a core material and a second releasing resin as a coating material, and wherein the first releasing resin has relatively higher releasing property than the second releasing resin.

In an embodiment, the first releasing resin has a surface tension of from about 0.01 N/m to about 0.025 N/m.

In an embodiment, the second releasing resin has a surface tension of from about 0.026 N/m to about 0.05 N/m.

In an embodiment, the first releasing resin contains polytetrafluoroethylene, silicone, mixtures thereof, and the like.

In an embodiment, the second releasing resin contains polyethylene, polypropylene, mixtures thereof, and the like.

In an embodiment, the prescribed film forming material contains an acrylic resin.

In another embodiment, the present invention provides a thermal transfer recording medium. The thermal transfer recording medium contains a support having formed thereon a releasing composition layer capable of being thermally transferred and mainly containing the releasing composition.

In yet another embodiment, a thermal transfer recording medium contains a support having formed consecutively thereon a releasing layer and a thermal transfer ink layer, wherein one of the releasing layer and the thermal transfer ink layer substantially contain the releasing composition.

In an embodiment, the thermal transfer ink layer contains a urethane-modified polyester resin having a number average molecular weight of about 25,000 or more and a ketone resin formed by polymerizing acetophenone and formaldehyde.

In an embodiment, a mixing ratio of the urethane-modified polyester resin and the ketone resin is from about 1/1 to about 3/7.

In an embodiment, the thermal transfer ink layer contains a sublimable dye.

In still yet another embodiment, a thermal transfer protective film containing a support having formed consecutively thereon a releasing layer and a thermal transfer protective layer, wherein one of the releasing layer and the protective layer mainly contains the releasing composition.

According to the releasing composition of the present invention, the releasing particles contained in the film forming material contain the first releasing resin as a core material having relatively higher releasing property than the second releasing resin as a coating material. In this regard, the coating material of the releasing particles has high adhesiveness to the film forming material and is difficult to be peeled therefrom, and thus the releasing particles do not easily drop off even upon application of an external force.

On the other hand, the coating material is scraped off due to the action of the external force to expose the core material having relatively higher releasing property, whereby the high releasing property is maintained. As a result, the abrasion resistance is improved in comparison to the conventional techniques.

The thermal transfer recording medium and the thermal transfer protective film according to the present invention provide a printed matter excellent in abrasion resistance owing to the use of the releasing composition.

Additional features and advantages of the present invention are described in, and will be apparent from, the following Detailed Description of the Invention and the figures.

DETAILED DESCRIPTION OF THE INVENTION

The present invention generally relates to a releasing composition. More specifically, the present invention relates to a releasing composition suitable for use in a thermal transfer recording medium, such as an ink ribbon. Embodiments of the invention will be described in detail with reference to the drawings.

Figure 1:
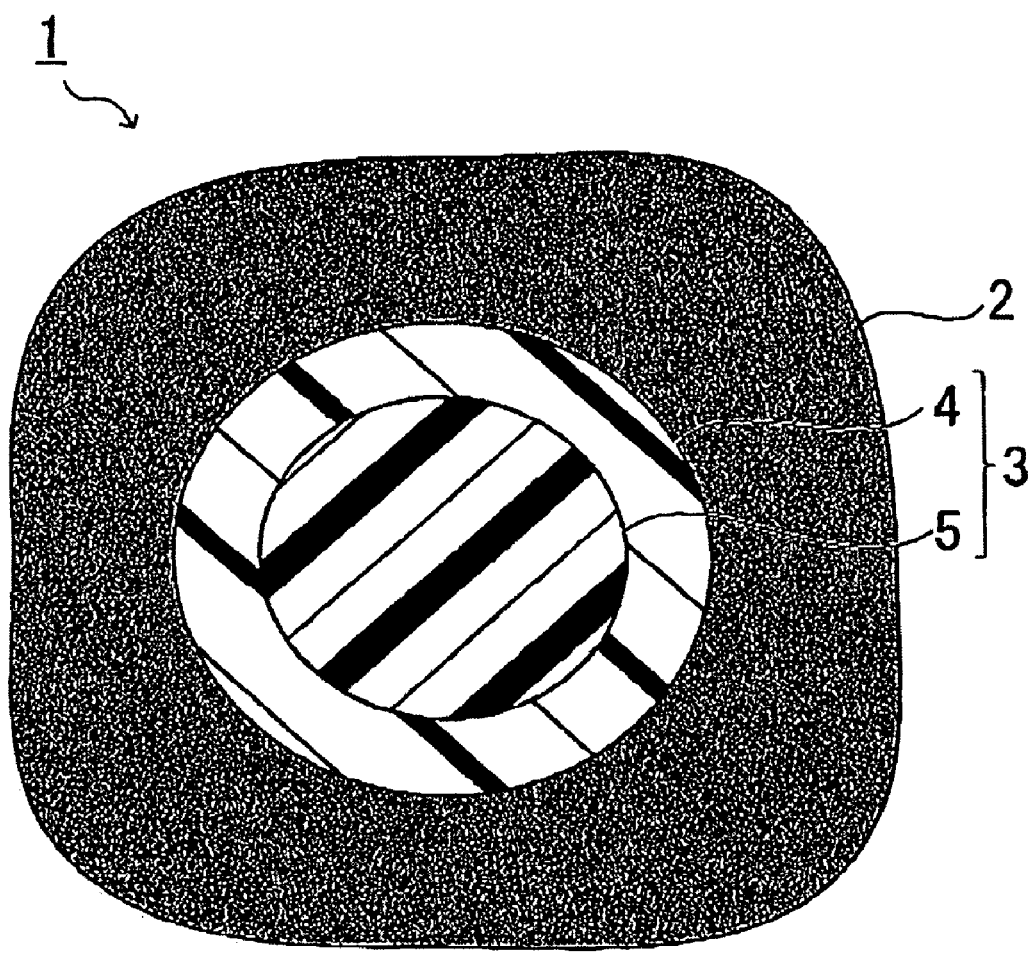
FIG. 1 is a cross sectional constitutional view showing an embodiment of a releasing composition according to an embodiment the present invention.

FIG. 1 is a cross sectional constitutional view showing an embodiment of a releasing composition according to the invention.

As shown in FIG. 1, the releasing composition 1 according to the invention contains releasing particles 3 in a prescribed film forming material 2. The film forming material 2 is not particularly limited, and a resin containing an acrylic resin is preferably used from the standpoint of ensuring releasing property to a support, such as PET and the like. The releasing particle 3 includes a core material 4 and a coating material 5 formed to cover the whole surface of the core material 4.

In this embodiment of the invention, the core material is formed with a first releasing resin, and the coating material 5 is formed with a second releasing resin. The first and second releasing resins used satisfy that the first releasing resin has relatively higher releasing property than the second releasing resin. As an index for indicating the releasing properties of the first and second releasing resins, for example, a surface tension of the resin may be used.

The surface tension of the first releasing resin is not particularly limited, and is preferably from about 0.01 N/m to about 0.025 N/m from the standpoint of ensuring the necessary abrasion resistance. Examples of the first releasing resin include a resin containing polytetrafluoroethylene, silicone, mixtures thereof, and the like.

The surface tension of the second releasing resin is not particularly limited, and is preferably from about 0.026 N/m to about 0.05 N/m from the standpoint of ensuring good adhesiveness to the film forming material 2. Examples of the second releasing resin include a resin containing polyethylene, polypropylene, mixtures thereof, and the like.

In an embodiment, the mixing ratio of the releasing particles 3 to the film forming material 2 is not particularly limited, and is preferably from about 3% to about 15% by weight from the standpoint of ensuring both good abrasion resistance and light transmittance. The particle diameter of the releasing particles 3 is preferably from about 0.1 μm to 20 μm in a dispersion state.

The releasing composition 1 in an embodiment can be produced, for example, in the following manner. In order to produce the releasing particles 3, the second releasing resin is dissolved in a solvent, such as toluene, heated to such a temperature that is equal to or higher than the softening point of the second releasing resin and is equal to or lower than the melting point of the first releasing resin. The first releasing resin is then dispersed in the solution of the second releasing resin thus obtained, and the dispersion is cooled to deposit the second releasing resin on the surface of the first releasing resin as the core material 4. Thus, the aforementioned releasing particles 3 are obtained. Thereafter, the releasing particles 3 are dispersed in the film forming material 2 dissolved in a solvent to obtain the objective releasing composition 1.

The releasing composition 1 in an embodiment can contain other resins for improving releasing property in such a range that does not impair the object of the invention. Examples of the resin include polyester, polyurethane, polystyrene, mixtures thereof, and the like.

According to the releasing composition 1 of this embodiment, the releasing particles 3 contained in the film forming material 2 have such a constitution that the first releasing resin as the core material 4 has relatively higher releasing property than the second releasing resin as the coating material 5. In this regard, the coating material 4 of the releasing particles 3 has high adhesiveness to the film forming material 2 and is difficult to be peeled therefrom, and thus the releasing particles 3 do not easily drop off even upon application of an external force.

On the other hand, the coating material 4 is scraped off due to the action of the external force to expose the core material 5 having relatively higher releasing property, whereby the high releasing property is maintained. As a result, the abrasion resistance is improved in comparison to the conventional techniques.

Figure 2:
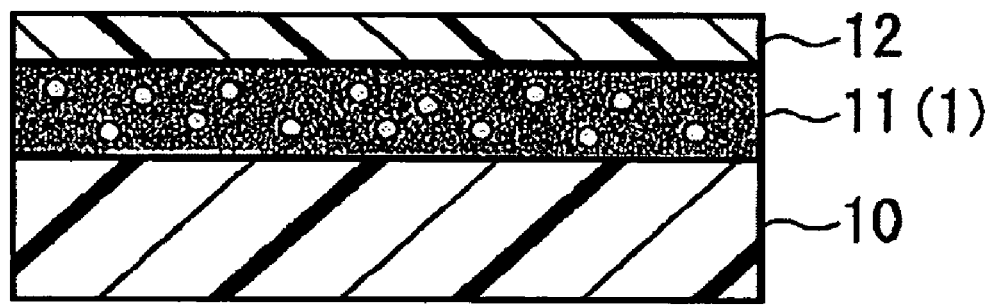
FIG. 2 is a cross sectional constitutional view showing an embodiment of a thermal transfer recording medium according to an embodiment of the present invention.

FIG. 2 is a cross sectional constitutional view showing an embodiment of a thermal transfer recording medium according to the invention. As shown in FIG. 2, the thermal transfer recording medium 6 of this embodiment contains a support 10 having formed consecutively thereon a releasing layer 11 and a thermal transfer ink layer (hereinafter, referred to as an ink layer) 12.

In an embodiment, the support 10 can include those materials that are used in the conventional thermal transfer recording material, and preferred examples thereof include a support formed with paper, such as condenser paper and parchment paper, and a support formed with plastics, such as a polyester film, a polyvinyl chloride film and a polycarbonate film.

The releasing layer 11 improves the transfer property of the transfer ink layer 12 upon thermal transfer, and at the same time, has such a role that the releasing layer 11 is sufficiently adhered to the support 10 and the ink layer 12 to prevent the ink layer 12 from being dropped off before thermal transfer, and protects the ink layer 12 after transfer. In an embodiment, the material for forming the releasing layer 11 includes the releasing composition 1 as discussed above.

The thickness of the releasing layer 11 may be variously selected under consideration of the other constitutional elements, such as the materials for the support 10 and the ink layer 12 and the printing conditions, and is preferably from about 0.1 to about 1 g/m$^2$ from the standpoint of printing energy, coating property and printing quality.

The ink layer 12 in an embodiment contains a colorant in a binder resin. The binder resin of the ink layer 12 is not particularly limited in species, and is preferably a resin containing a urethane-modified polyester resin having a number average molecular weight of about 25,000 or more and a ketone resin formed by polymerizing acetophenone and formaldehyde from the standpoint of improving the solvent resistance. These two resins have good compatibility with each other and are easily adjusted in viscosity, and therefore, they are excellent in workability. The mixing ratio of the urethane-modified polyester resin and the ketone resin is not particularly limited, and is preferably from about 1/1 to about 3/7 from the standpoint of printing sensitivity and printing quality.

The colorant used in an embodiment can include those materials that are used in the conventional thermal transfer recording material. Examples of the colorant for a heat-melting thermal transfer recording medium include a black pigment, such as carbon black, and a color pigment, such as an organic pigment and an inorganic pigment.

The ink layer 12 in an embodiment contains other resins for improving printing quality in such a range that does not impair the object of the invention. Examples of the resin include a polyester resin, a polyamide resin, an acrylic resin, an epoxy resin, a urethane resin, mixtures thereof, and the like. In an embodiment, a heat-resistant lubricating layer is formed to improve the running property of the thermal transfer recording medium 6 by using a known silicone copolymer or silicone oil on the surface of the support 10 opposite to the surface having the ink layer 12 formed thereon.

The thermal transfer recording medium 6 can be produced in an ordinary process. For example, the releasing layer 11 is formed by coating a composition for forming the releasing layer on the support 10 by gravure coating or other methods, and then the ink layer 12 is formed by coating a composition for forming the ink layer thereon by gravure coating or other methods. According to this embodiment of the invention having the aforementioned constitution, such a thermal transfer recording medium 6 can be obtained that is excellent in abrasion resistance and solvent resistance.

Figure 3:
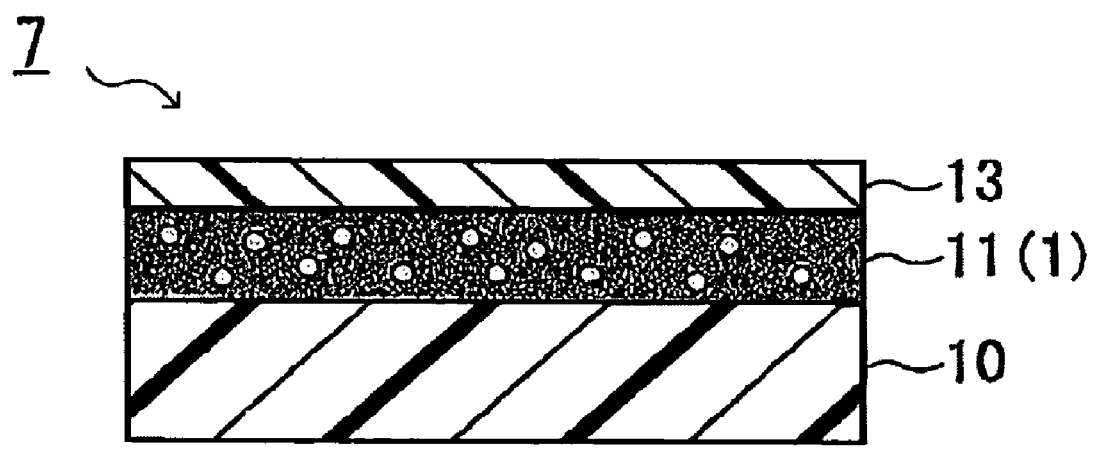
FIG. 3 is a cross sectional constitutional view showing an embodiment of a thermal transfer protective film according to an embodiment of the present invention.

FIG. 3 is a cross sectional constitutional view showing an embodiment of a thermal transfer protective film according to an embodiment. As shown in FIG. 3, the thermal transfer protective film 7 of this embodiment contains a support 10 having formed consecutively thereon a releasing layer 11 and a protective layer 13.

A binder resin of the protective layer 13 is not particularly limited in species, and is preferably a resin containing a urethane-modified polyester resin having a number average molecular weight of about 25,000 or more and a ketone resin formed by polymerizing acetophenone and formaldehyde from the standpoint of improving the solvent resistance.

The mixing ratio of the urethane-modified polyester resin and the ketone resin is not particularly limited, and is preferably from about 1/1 to about 3/7 by weight ratio from the standpoint of printing sensitivity and film strength. The thermal transfer protective film 7 may be produced in the ordinary process. For example, the releasing layer 11 is formed by coating a composition for forming the releasing layer on the support 10 by gravure coating or other methods, and then the protective layer 13 is formed by coating a composition for forming the ink layer thereon by gravure coating or other methods. According to this embodiment of the invention having the aforementioned constitution, such a thermal transfer protective film 7 can be obtained that is excellent in abrasion resistance and solvent resistance.

Figure 4:
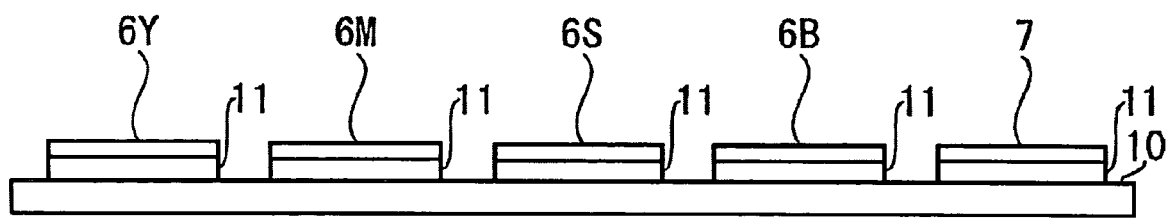
FIG. 4 is a cross sectional constitutional view showing another embodiment of a thermal transfer recording medium according to an embodiment of the present invention.

FIG. 4 is a cross sectional constitutional view showing another embodiment of a thermal transfer recording medium according to the invention. As shown in FIG. 4, the thermal transfer recording medium 8 of this embodiment contains a support 10 having formed successively on the same surface thereof sublimation thermal recording media 6Y, 6M and 6C, a heat-melting thermal transfer recording medium 6B, and a thermal transfer protective film 7. The thermal transfer recording media 6Y, 6M, 6C and 6B have the constitution shown in FIG. 2, and the thermal transfer protective film 7 has the constitution shown in FIG. 3. According to the thermal transfer recording medium 8 of this embodiment having the aforementioned constitution, a printed matter excellent in abrasion resistance and solvent resistance can be formed.

The invention is not limited to the aforementioned embodiments, but various changes may be made therein. For example, while the releasing composition of the invention is applied to the releasing layers of the thermal transfer recording medium and the thermal transfer protective film in the aforementioned embodiment, the invention is not limited thereto, and the releasing composition can be applied to the ink layer. Furthermore, the invention can be applied to such an embodiment that no releasing layer is provided on the support, but only an ink layer or a protective layer is provided.

EXAMPLE

The thermal transfer recording medium of the invention will be described in more detail with reference to the following examples and comparative examples without limitation to the scope of the present invention.

Example 1

Preparation of Composition for Forming Releasing Layer

Ten parts by weight of a filler (Hidisper 1466, produced by Gifu Shellac Co., Ltd., particle diameter: 10 to 15 μm in dispersion state) having polytetrafluoroethylene as a core material covered with polyethylene was dispersed in 13.5 parts by weight of binder resin containing an acrylic resin (Dianal BR80, produced by Mitsubishi Rayon Co., Ltd.) by using 76.5 parts by weight of toluene as a solvent to prepare a target composition for forming a releasing layer.

Preparation of Composition for Forming Ink Layer

The following materials were dissolved in 70 parts by weight of methyl ethyl ketone as a solvent to prepare a target composition for forming an ink layer.

Urethane-modified polyester resin: 60 parts by weight
(UR-8200, produced by Toyobo Co., Ltd.)
Carbon black: 40 parts by weight
(Regal 660, produced by Cabot Oil & Gas Corp.)

Production of Thermal Transfer Recording Medium

A releasing layer was formed on a surface of a PET film by gravure coating using the aforementioned composition for forming a releasing layer, and then the solvent was evaporated.

An ink layer was then formed on the releasing layer by gravure coating using the aforementioned composition for forming an ink layer, and then the solvent was evaporated to obtain a target thermal transfer recording medium.

Example 2

A thermal transfer recording medium was produced in the same manner as in Example 1 except that the ink layer was formed by using the following materials.

Urethane-modified polyester resin: 30 parts by weight
(UR-8200, produced by Toyobo Co., Ltd.)
Polyester resin: 30 parts by weight
(Elitel UE3380, produced by Unitika Ltd.)
Carbon black: 40 parts by weight
(Regal 660, produced by Cabot Oil & Gas Corp.)

Example 3

A thermal transfer recording medium was produced in the same manner as in Example 1 except that the ink layer was formed by using the following materials.

Urethane-modified polyester resin: 30 parts by weight
(UR-8200, produced by Toyobo Co., Ltd.)
Acetophenone resin: 30 parts by weight
(Halon 80, produced by Honshu Chemical Industry Co., Ltd.)
Carbon black: 40 parts by weight
(Regal 660, produced by Cabot Oil & Gas Corp.)

Comparative Example 1

A thermal transfer recording medium was produced in the same manner as in Example 1 except that polyethylene particles (Hiflat T10P-2, produced by Gifu Shellac Co., Ltd., particle diameter: 10 μm to 20 μm in dispersion state) were used as a filler in the releasing layer.

Comparative Example 2

A thermal transfer recording medium was produced in the same manner as in Example 1 except that polytetrafluoroethylene particles (KTL500F, produced by Kitamura Ltd., particle diameter: 1 μm to 5 μm in powder form) were used as a filler in the releasing layer.

Comparative Example 3

A thermal transfer recording medium was produced in the same manner as in Example 1 except that silicone particles (XC99-A8808, produced by Toshiba Silicone Co., Ltd., particle diameter: 0.7 μm in powder form) were used as a filler in the releasing layer.

Evaluation

The thermal transfer recording media of Examples and Comparative Examples were evaluated according to the following evaluation items. The results are shown in Table 1 below.

TABLE 1

Evaluation Results of Examples and Comparative Examples

|  | Example 1 | Example 2 | Example 3 | Comparative Example 1 | Comparative Example 2 | Comparative Example 3 |
|---|---|---|---|---|---|---|
| Abrasion test (cycle) | ≧1,000 | ≧1,000 | ≧1,000 | 200 to 300 | 300 | 5 |
| Fog on printed surface | A | A | A | B | A | A |
| Ink coating property | A | A | A | A | B | B |
| Solvent resistance | A | A | A | A | A | A |

1. Abrasion Test

A PVC card having a bar-code image immediately after printed thereon was placed on a pedestal of an abrasion test machine in such a manner that the bar-code image faced upward. The surface of the bar-code image was abraded with a sapphire chip having an outer diameter of 0.25 mm with a load of 200 g, and the number of cycles until a flaw was formed on the bar-code image.

2. Fog on Printed Surface (Haze)

A bar-code image immediately after printed on a PVC card was visually observed. A part of the printed surface was wiped out, and the evaluation was made in such a manner that the case where no unevenness in density formed was evaluated as "A", and the case where unevenness in density formed was evaluated as "B".

3. Ink Coating Property

An ink was coated on the releasing layer with a Maier bar, and the coated film was visually observed. The evaluation was made in such a manner that the case where no failure, such as pinhole due to repelling, occurred was evaluated as "A", and the case where a failure, such as pinhole due to repelling, occurred was evaluated as "B".

4. Solvent Resistance

A printed matter was immersed in a 70% solution of isopropyl alcohol for 4 hours and then rubbed with fingers, and the resulting state was visually observed to evaluate resistance to the solution. The evaluation was made in such a manner that the case where no change occurred in the printed matter was evaluated as "A", and the case where the printed matter was peeled off was evaluated as "B".

Results

It was understood from the results shown in Table 1 that the thermal transfer recording media of Examples 1 to 3 were excellent in all the abrasion test, fog on printed surface, ink coating property and solvent resistance. On the other hand, the thermal transfer recording media of Comparative Examples 1 to 3 were considerably inferior in abrasion test as compared to Examples 1 to 3.

Furthermore, Comparative Example 1 using polyethylene particles as a filler in the releasing layer was inferior in fog on printed surface, Comparative Example 2 using polytetrafluoroethylene particles as a filler in the releasing layer was inferior in ink coating property, and Comparative Example 2 and Comparative Example 3 using silicone particles as a filler in the releasing layer suffered formation of pinhole in the ink coated layer.

As described in detail hereinabove, according to an embodiment of the present invention, the abrasion resistance of the releasing composition, particularly the thermal transfer recording medium, can be improved.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A releasing composition comprising releasing particles in an acrylic film forming resin, the releasing particles comprising:
   a first releasing resin as a core material; and
   a second releasing resin as a coating material, that envelops the core material,
   wherein the first releasing resin has a relatively higher releasing property than the second releasing resin.

2. The releasing composition according to claim 1, wherein the first releasing resin has a surface tension of about 0.01 N/m to about 0.025 N/m.

3. The releasing composition according to claim 1, wherein the second releasing resin has a surface tension of about 0.026 N/m to about 0.05 N/m.

4. The releasing composition according to claim 1, wherein the first releasing resin contains at least any one of polytetrafluoroethylene and silicone.

5. The releasing composition according to claim 1, wherein the second releasing resin contains at least any one of polyethylene and polypropylene.

* * * * *